United States Patent
Lamothe

(10) Patent No.: US 8,694,487 B2
(45) Date of Patent: Apr. 8, 2014

(54) PROJECT MANAGEMENT SYSTEM

(75) Inventor: Ricardo Panero Lamothe, Malaga (ES)

(73) Assignee: Accenture Global Services Limited, Dublin (IE)

( * ) Notice: Subject to any disclaimer, the term of this patent is extended or adjusted under 35 U.S.C. 154(b) by 87 days.

(21) Appl. No.: 13/083,284

(22) Filed: Apr. 8, 2011

(65) Prior Publication Data

US 2011/0252019 A1 Oct. 13, 2011

(30) Foreign Application Priority Data

Apr. 8, 2010 (EP) .................................... 10380052

(51) Int. Cl.
*G06F 17/30* (2006.01)

(52) U.S. Cl.
USPC .......... 707/720; 707/610; 705/7.11; 705/7.27

(58) Field of Classification Search
USPC ................ 707/100, 104, 610, 714, 803, 719; 705/7.11, 7.27
See application file for complete search history.

(56) References Cited

U.S. PATENT DOCUMENTS

| | | | |
|---|---|---|---|
| 6,480,850 B1 * | 11/2002 | Veldhuisen | 707/610 |
| 6,519,763 B1 | 2/2003 | Kaufer et al. | |
| 7,552,065 B1 * | 6/2009 | Blanco | 705/7.23 |
| 7,925,645 B2 * | 4/2011 | Zhao et al. | 707/714 |
| 2003/0144969 A1 * | 7/2003 | Coyne | 705/400 |
| 2006/0004750 A1 | 1/2006 | Huang et al. | |
| 2009/0112927 A1 * | 4/2009 | Chitnis et al. | 707/104.1 |
| 2009/0193039 A1 * | 7/2009 | Bradley et al. | 707/100 |
| 2010/0049715 A1 * | 2/2010 | Jacobsen et al. | 707/8 |
| 2010/0287036 A1 * | 11/2010 | Guinta et al. | 705/10 |
| 2011/0238709 A1 * | 9/2011 | Liu et al. | 707/803 |

OTHER PUBLICATIONS

Elmasri R. et al. "Fundamentals of Database Systems—Passage (Overview of the Relational Database Design, including relational database design" Fundamentals of Database Systems, XX, XX, Jan. 1, 1994, pp. 172-177,447, XP002435374.

Turker C. et al. "Semantic integrity support in SOL:1999 and commercial (object-) relational database management systems" VLDB Journal, Springer Verlag, Berlin, DE LNKD-001:10.1007/S0077801 00050, vol. 10, No. 4, Jan. 1, 2001, pp. 241-269, XP0022622481SSN: 1066-8888.

International Search Report for European Patent Application No. 10 380 052.0. European Patent Office. Sep. 6, 2010.

* cited by examiner

*Primary Examiner* — James Trujillo
*Assistant Examiner* — Thong Vu
(74) *Attorney, Agent, or Firm* — Mannava & Kang, P.C.

(57) ABSTRACT

A project management system includes a database formed of one or more tables and a computing device having one or more modules configured to: receive data and an identifier of the data, store the data in one or more tables of the database based upon the data identifier, in which the one or more tables in the database are accessible by a database management tool, and produce one or more records corresponding to the data stored in the one or more tables, in which the one or more records are accessible by a project management tool.

15 Claims, 8 Drawing Sheets

DATABASE MANAGEMENT TOOL INTERFACE SCREENSHOT 400

| Activity | WpID | EnterpriseID | JournalDate | TasksType | Journal Effort | EtcEffort | Overtime |
|---|---|---|---|---|---|---|---|
| Checks - Fails | | | | ∨ | | | |

*FIG. 6*

SPREADSHEET INTERFACE SCREENSHOT 600

| Id | Headline | State | Stage | Baseline Work | Complexity | Location |
|---|---|---|---|---|---|---|
| ID 1 | F. DESIGN 1 | 3A_InProg | 0-PM | | | File Loc. 1 |
| ID 2 | F. DESIGN 2 | 2_Ready | 2-Analyze | 60 | Medium | File Loc. 2 |
| ID 3 | TECH DESIGN 1 | 4A_Completed | 2-Analyze | 50 | Easy | File Loc. 2 |
| ID 4 | TECH DESIGN 2 | 3A_InProg | 3-Design | 30 | Complex | File Loc. 2 |
| ID 5 | TECH DESIGN 3 | 3A_InProg | 3-Design | 150 | Easy | File Loc. 3 |
| ID 6 | BUILD 1 | 1_Waiting | 4-Build | 20 | Complex | File Loc. 3 |
| ID 7 | BUILD 2 | 1_Waiting | 4-Build | 60 | Medium | File Loc. 3 |
| ID 8 | BUILD 3 | 1_Waiting | 4-Build | 80 | Medium | File Loc. 3 |

SPREADSHEET INTERFACE SCREENSHOT 700

*FIG. 7*

PROJECT MANAGEMENT SYSTEM

CLAIM FOR PRIORITY

The present application claims the benefit of priority under 35 U.S.C. §119 to European Patent Application No. 10380052.0-1238, filed on Apr. 8, 2010, the disclosure of which is hereby incorporated by reference in its entirety.

BACKGROUND

Project management generally refers to the managing of resources, time, cost, and performance to complete a project composed of a plurality of tasks. The tasks typically include managing a number of technically complex project resources, managing funding and budgets, combining and managing the abilities and times of a large number of people, and reporting the progress of a project in reaching one or more goals. A number of project management tools have been developed to assist with management of these tasks. One software based project management tool is Microsoft Project™.

Generally speaking, conventional project management tools, such as Microsoft Project™, provide environments for managing events within a project, with the ability to roll up events, indicate predecessors of events, calculate critical paths, reschedule events in order to optimize the project schedule, generate reports, etc. In this regard, project managers typically input the tasks necessary for the completion of a project into a project management tool along with information about each task, such as task dependencies, resources required, and the estimated times for completing each of the tasks. Project managers are also able to update the performance statuses of the tasks in the project management tool. The project management tools are also able to generate reports on the progress of the project, reanalyze the schedule, compute new estimated times to compete the project, and possibly reallocate resources.

During the planning stage of the project, project managers typically input project management information including projects, project tasks, and system resources, herein referred to as project management information, into the project management tool where it is used to create and store project data objects in a primary database. The project management tool uses this information to create a project schedule. Once the project schedule is created, task status information is input into the project management system in order to monitor and report project progress. The native functions of conventional project management tools include producing a schedule of tasks for a given project, reporting conflicts relating to resource utilization and/or monitoring the progress of the project toward completion based upon input task status information.

The project is typically thus a sequence of tasks utilized to achieve an end result. Project managers typically assign individual personnel (resources) to perform each task, which includes defining which individual personnel are authorized to charge time particular tasks. In addition, project managers typically manually analyze the time inputted by the personnel. The project managers thus spend a relatively large amount of time in tracking which personnel are authorized to charge time to which task as well as in analyzing the time inputted by the personnel. Project managers thus often become bottlenecks in the completion of projects because of the amount of time required to perform these tasks.

BRIEF DESCRIPTION OF THE DRAWINGS

Features of the present invention will become apparent to those skilled in the art from the following description with reference to the figures, in which:

FIGS. 6 and 7, respectively, illustrate screenshots of portions of example spreadsheet application interfaces, according to embodiments of the present invention;

DETAILED DESCRIPTION

For simplicity and illustrative purposes, the present invention is described by referring mainly to an example embodiment thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the description of the embodiments.

Disclosed herein is a project management system and method of managing a project using a computing device of the project management system. As discussed herein below, the data used in managing projects are organized in various manners to enable efficient access and use of the data through both a project management tool and a database management tool. The project management system and method disclosed herein enable project managers to assign teams of resources (personnel) to deliverables in a one-to-one relationship. In contrast, in conventional project management systems, resources are assigned to tasks in an m-to-n relationship. In addition, the project management system and method disclosed herein enable timesheets entered by personnel working on the project to be validated automatically.

Through implementation of the project management system and method disclosed herein, the amount of time required to schedule and assign deliverables as well as to validate timesheets may substantially be reduced as compared with conventional project management systems. In one regard, therefore, the project management system and method disclosed herein enable projects to be completed in a relatively faster and smoother manner and thus, substantially removes the project manager from being a bottleneck in the project performance.

Figure 1:
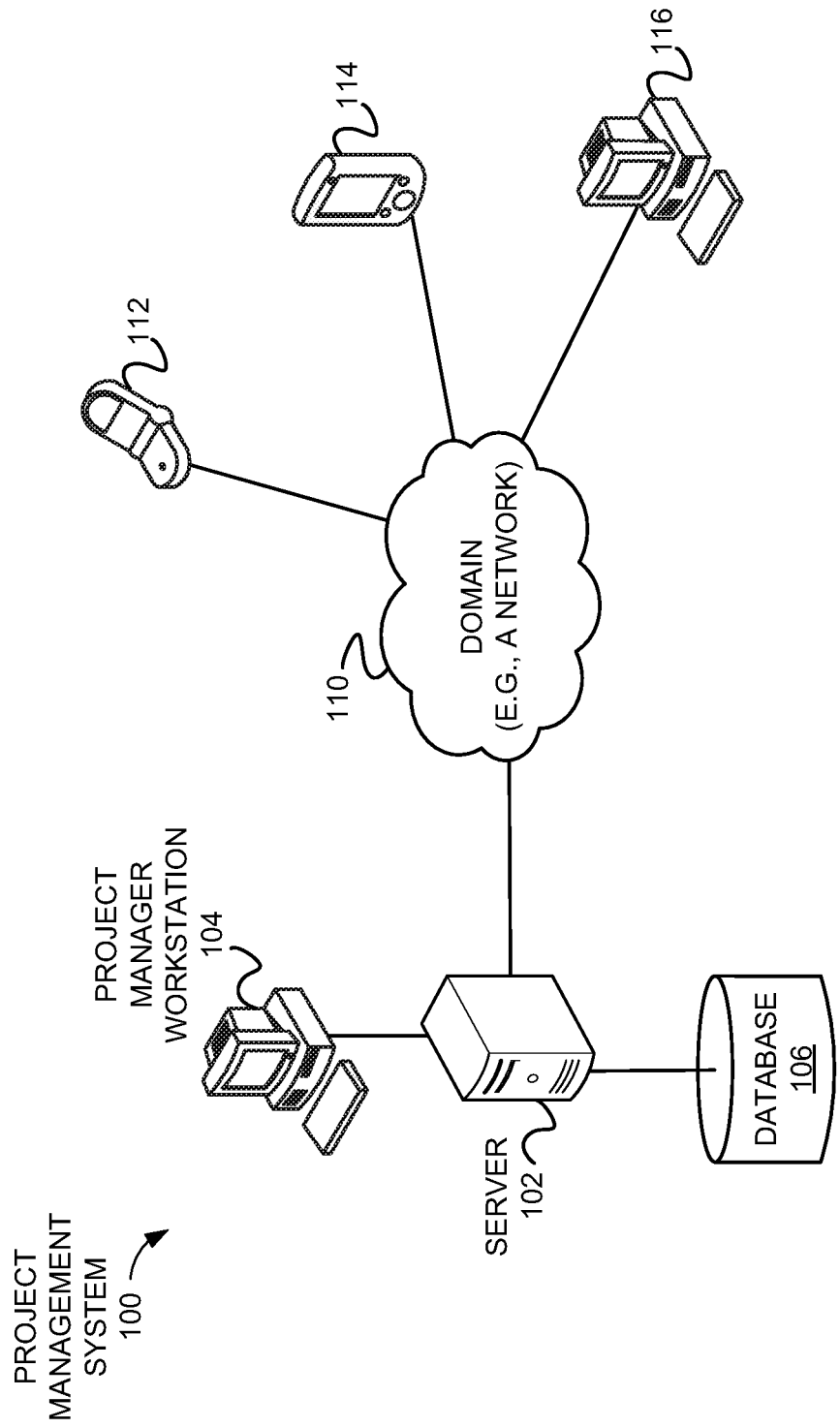
FIG. 1 shows a simplified block diagram of a project management system, according to an embodiment of the present invention.

With reference first to FIG. 1, there is shown a simplified block diagram of a project management system 100, which provides a platform upon which example embodiments disclosed herein may be implemented, according to an embodiment. It should be clearly understood that the project management system 100 may include additional components and that some of the components described herein may be removed and/or modified without departing from a scope of the project management system 100. As such, the project management system 100 may include any number of computing devices, client devices, and databases.

As shown in FIG. 1, the project management system 100 includes a server 102, a project manager workstation 104, and a database 106. The server 102 is also depicted as being connected to a network 110, which may be an intranet, the Internet, a Wide Area Network (WAN), a Local Area Network (LAN), or some other network and suitable topology associated with the network. In addition, operatively connected to the network 110 are a plurality of client devices including, a cellular telephone 112, a Personal Digital Assistant (PDA) 114, and a computer system 116.

Although the project manager workstation 104 and the database 106 have been depicted as being directly connected to the server 102, it should be understood that the project manager workstation 104 and the database 106 may also communicate with the server 102 over the network 110 without departing from a scope of the project management system 100. In addition, although the server 102, the project manager workstation 104, and the database 106 have been depicted as separate components, it should be understood that the functionalities of these components may be combined into fewer than the three components depicted in FIG. 1.

Generally speaking, a project manager uses the project manager workstation 104 to input data pertaining to, for instance, workplan, deliverables and resource information into the database 106, which is accessible by a project management tool and a database management tool. The project manager may also input information pertaining to the categories of the data, for instance, by data identifiers. The project management tool and the database management tool may comprise software stored on the server 102, project manager workstation 104, and/or the database 106. Alternatively, however, the project management tool and/or the database management tool may comprise web-based applications that the project manager may access through a web-based interface.

In any regard, the project management tool may comprise a commercially available project management tool, such as Microsoft Project™, and the database management tool may comprise a commercially available database management tool, such as, ClearQuest™ available from the IBM Corporation. As discussed in greater detail hereinbelow, a computing device, such as the project manager workstation 104 or the server 102, of the project management system 100 is configured to cause data to be accessible by both the project management tool and the database management tool.

In addition, users, such as personnel involved in the project, may use the client devices 112-116 to input various data pertinent to the project into the server 102. The data may include, for instance, time worked on the deliverables by the users, time charged to other matters, information pertaining to the users, record types, etc. The users may also input identifiers of the data. According to an embodiment, the client devices 112-116 have stored locally thereon, a spreadsheet application, such as, Microsoft Excel™, through which the users may input the data. Users may thus input the data while the client devices 112-116 are either connected to or disconnected from the network 110, which may increase the probability that the users will enter their timesheets.

The server 102 and/or the project manager workstation 104 is configured to store the data received from the project manager workstation 104 and the client devices 112-116 in the database 106. As discussed in greater detail hereinbelow, the database 106 includes a plurality of tables and the data is automatically stored in the tables based upon the data identifiers.

As discussed in greater detail herein below, a project manager may use the project manager workstation 104 to assign teams of resources (personnel) to deliverables, which may include, for instance, design, review design, rework design, fix design, etc. As such, for instance, personnel assigned to a particular team may charge time to a particular deliverable if the project manager assigns that particular team to the deliverable. References to the project manager and the project manager workstation 104 are merely labels provided for purposes of convenience. It should therefore be understood that any workstation, for example, any of the client devices 112-116, may function as a project manager workstation. The function supported by a particular workstation is determined by the user's access level, and thus, a project manager may log into one of the client devices 112-116 and that client device 112-116 would function as both a project manager workstation 104 and a client device. In addition, the project manager may use the project manager workstation 104 and/or the client devices 112-116 to monitor project and deliverable status.

Figure 2:
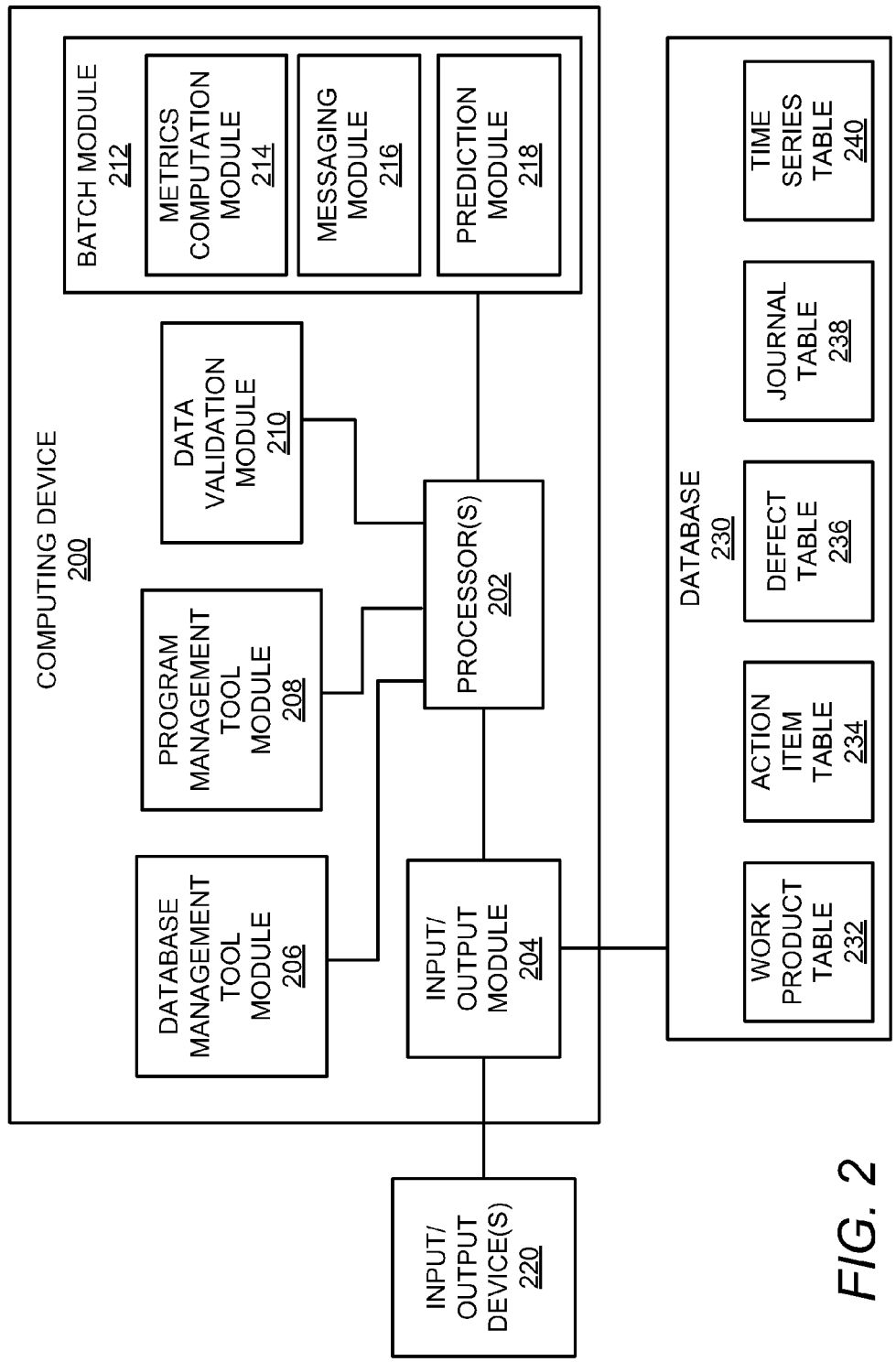
FIG. 2 illustrates a block diagram of computing device configured to execute a set of instructions in the project management system depicted in FIG. 1, according to an embodiment of the present invention.

Turning now to FIG. 2, there is shown a block diagram of a computing device 200 configured to execute a set of instructions in the project management system 100, according to an embodiment. It should be clearly understood that the computing device 200 may include additional components and that some of the components described herein may be removed and/or modified without departing from a scope of the computing device 200.

In one embodiment, the computing device 200 comprises the project manager workstation 104 or the server 102, or a device operable to perform functions of both the project manager workstation 104 and the server 102. In another embodiment, the computing device 200 comprises a computing device separate from the project manager workstation 104 and the server 102. In this embodiment, the computing device 200 may comprise one or more computing devices that provide web-based access and applications to the project manager workstation 104, the server 102, and/or the client devices 112-116.

As shown in FIG. 2, the computing device 200 includes one or more processors 202, an input/output module 204, a database management tool module 206, a program management tool module 208, a data validation module 210, and a batch module 212. The batch module 212 is depicted as including a metrics computation module 214, a messaging module 216, and a prediction module 218. According to an example, the modules 204-218 comprise software stored, for instance, in a volatile or non-volatile memory, such as DRAM, EEPROM, MRAM, flash memory, floppy disk, a CD-ROM, a DVD-ROM, or other optical or magnetic media, and the like. In this example, the modules 204-218 comprise software modules stored in the memory, which are executable by the processor 202. According to another example, the modules 204-218 comprise hardware devices, such as, a circuit or multiple circuits arranged on a board. In this example, the modules 204-218 comprise circuit components or individual circuits, which may also be controlled by the processor 202. According to a further example, the modules 204-218 comprise a combination of hardware and software components.

The computing device 200 is also depicted as being in communication with one or more input/output devices 220 and a database 230. The input/output devices 220 may include, for instance, the project manager workstation 104 and the client devices 112-116. In addition, the database 230, which may comprise the database 106 depicted in FIG. 1, is illustrated as including a plurality of tables 232-240.

Figure 3:
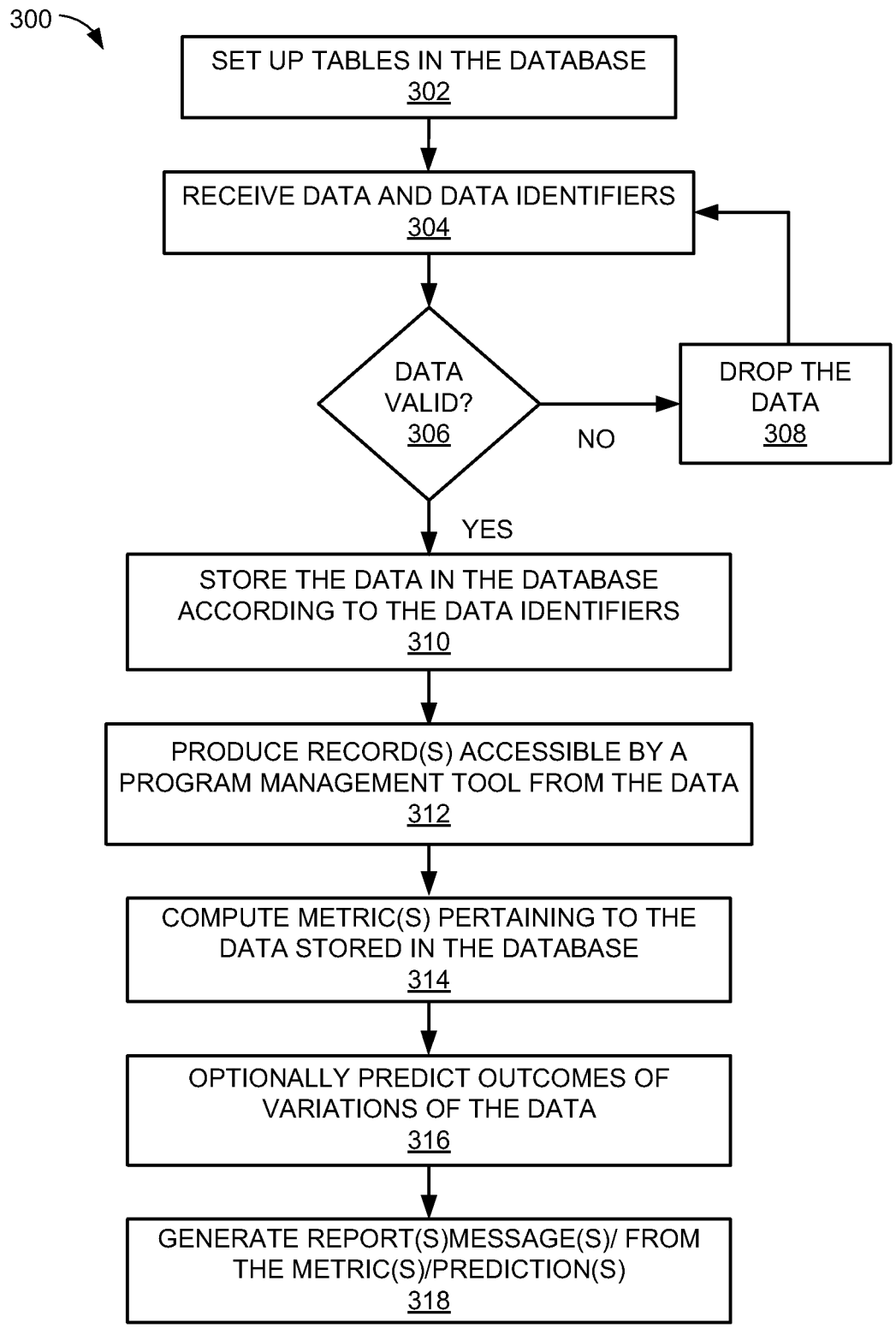
FIG. 3 illustrates a flow diagram of a method of managing a project, according to an embodiment of the present invention.

Various manners in which the modules 204-218 may operate in performing various functions in a project management operation are discussed with respect to the method 300 depicted in FIG. 3. FIG. 3, more particularly depicts a method 300 of managing a project, according to an example. It should be apparent to those of ordinary skill in the art that the method discussed below with respect to FIG. 3 represents a generalized illustration and that other steps may be added or existing steps may be removed, modified or rearranged without departing from a scope of the method 300.

The description of the method 300 is made with reference to the project management system 100 illustrated in FIG. 1 and to the computing device 200, input/output device 220, and database 230 illustrated in FIG. 2, and thus makes reference to the elements cited therein. It should, however, be understood that the method 300 is not limited to the elements set forth in FIGS. 1 and 2. Instead, it should be understood that the method 300 may be practiced by a computing device or software stored on a computer readable storage medium implemented or executed by the computing device having a different configuration than that set forth in the project management system 100 and computing device 200.

In addition, the method 300 pertains to either or both of an initial project management setup operation and an implementation of a project management operation following the initial setup operation. In this regard, some of the steps discussed with respect to the method 300 may pertain solely to the initial setup operation and some of the steps may pertain solely to the implementation of the project management operation following the initial setup operation. The steps associated with the initial setup operation and the implementation operation have been combined into the method 300 for ease of understanding and to avoid duplicative descriptions of similar steps performed in both operations. As such, it should be clearly understood that the method 300 may be split to be directed to each of the operations individually without departing from a scope of the methods disclosed herein.

As shown in FIG. 3, at step 302, a plurality of tables 232-240 are set up in the database 230. The tables 232-240 shown therein are a work product table 232, an action item table 234, a defects table 236, a journal table 238, and a time series table 240. The work product table 232 may include data pertaining to work plans, deliverables (such as, the budget, owner, dates, etc.), teams, resources, etc. The action item table 234 may include data pertaining to risks, issues, reviews, communications, etc. The defect table 236 may include data pertaining to problems, defects, etc. The journal table 238 may include data pertaining to work products, resources, dates, efforts, etc. The time series table 240 may include data pertaining to measures, metrics, baselines, etc., associated with the deliverables of the project. In one regard, because all of the data compiled in the project management system 100 pertaining to the project may be stored in the five tables 232-240, the database 230 may only require a relatively small amount of storage capacity and accessibility capabilities.

In one example, the database management tool module 206 may set up the tables 232-240 on the database 230. In this example, the database management tool 206 may be programmed with the table descriptions and may upload the tables 232-240 during an initial setup operation. In another example, a program manager may set up the tables 232-240 manually through use of the project manager workstation 104. In either of these examples, rules associated with how the data is to be inserted into the tables 232-240 may be pre-defined. For instance, the rules may define that the data be stored in particular ones of the tables 232-240 based upon particular identifiers of the data.

At step 304, data and identifiers of the data are received by the computing device 200, for instance, through the input/output module 204. In a first example in which an initial project management setup operation is performed, the data may include work plans, which may include time frames by which tasks or deliverables are to be performed. The data may also include an identification of the deliverables and teams of personnel assigned or authorized to charge time to the respective deliverables. As discussed above, this type of correlation between deliverables and teams of personnel authorized to charge time working on the deliverables differs from associations made between tasks and resources in conventional project management tools.

Figure 4:
FIGS. 4 and 5, respectively, illustrate screenshots of portions of example database management tool interfaces, according to embodiments of the present invention.

In this example, the project manager may input the data identifiers along with the data into a spreadsheet application accessible on the project manager workstation 104. A screenshot 400 of a portion of an example of a database management tool interface through which the project manager may input the data and the data identifiers is depicted in FIG. 4. According an example, the screenshot 400 depicts an example of an interface of the database management tool 206. As shown in the screenshot 400, the spreadsheet application provides the project manager with a number of predefined fields through which the project manager may input various data and data identifiers. For instance, in assigning the teams of personnel who are authorized to charge to a particular deliverable, which may be identified under the "Headline" section, the project manager may specify a particular record type (RecordTypeID) associated with the particular deliverable and may identify the team name under the "Team" section. Thus, the project manager may easily assign deliverables to particular teams of personnel. In one regard, the computing device 200 is therefore able to restrict who is authorized to the deliverables, which is faster and more efficient than assigning resources to each and every task as is required with conventional project management systems.

As shown in FIG. 4, the project manager may identify a particular deliverable as having a particular identifier (RecordTypeID) and a particular team of personnel (TeamName) as having another particular identifier. As discussed below, the computing device 200 may use the data identifiers to store the data in the tables 232-240. As also shown in FIG. 4, the project manager may input data pertaining to different aspects of a project through the interface provided by the spreadsheet application. For instance, the project manger may add additional action items and defects.

Figure 5:
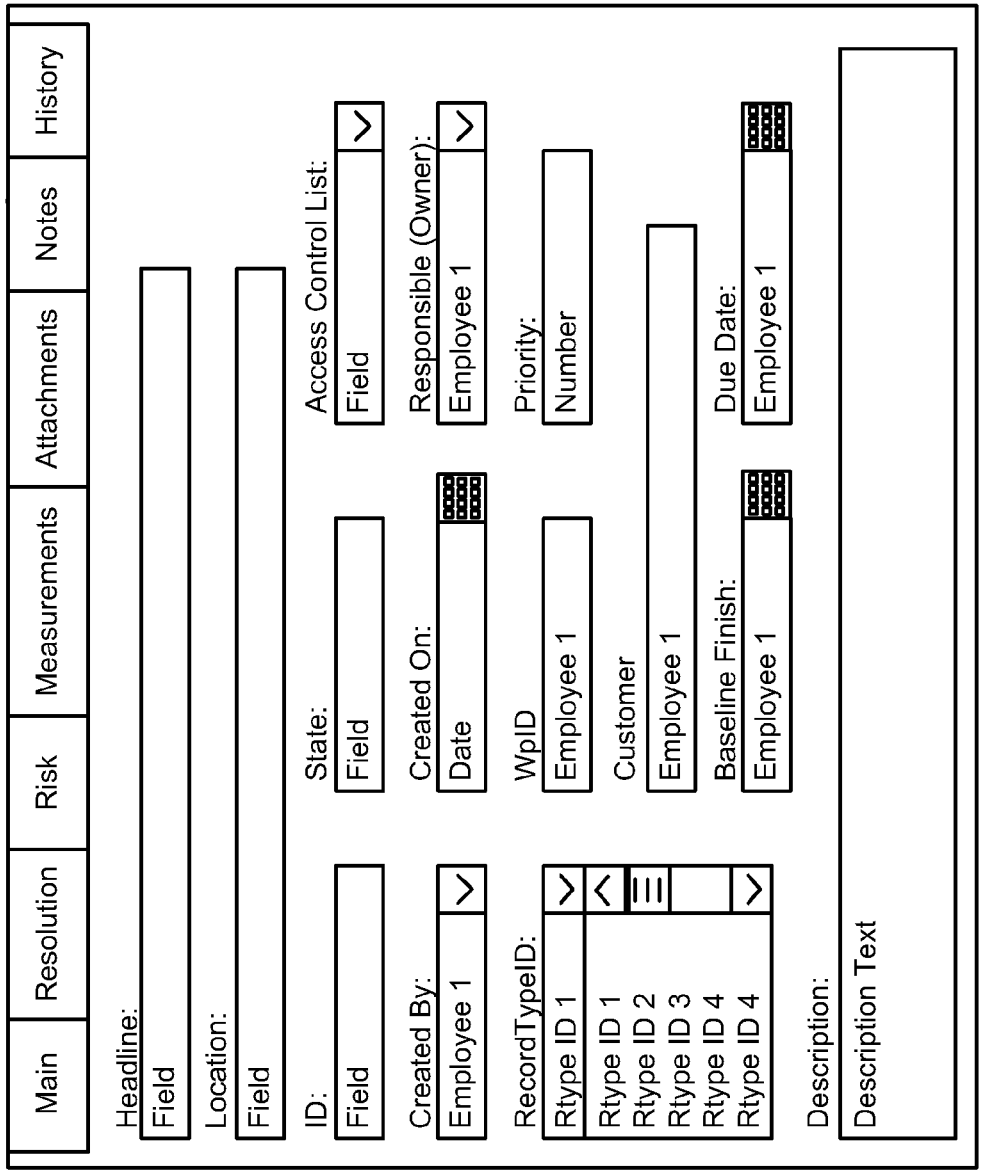

With reference now to FIG. 5, there is shown a screenshot 500 of a portion of an example of a database management tool interface through which the project manager and/or a user may input data pertaining to risks. According an example, the screenshot 500 depicts an example of an interface of the database management tool 206. As shown therein, the project manager and/or user may identify the type of the risk (RecordTypeID) and provide a description of the risk (Description Text) through the interface. In this regard, the program manager or the user may input data pertaining to risks without being required to create an issue. As such, monitoring the statuses of the risks is relatively easier through this inputting method because each owner (Responsible) of the risk will be informed of the risk by the computing device 200. In one example, the computing device 200 is configured to send a message, for instance, via email, text, or other communication means, to the owners of the risks.

Although not explicitly shown, the database management tool 206 may provide additional input screens through which various other information may be inputted by program managers and/or users. In addition, the interfaces depicted in FIGS. 4 and 5 may comprise web-based interfaces to the database management tool 206, which may be used to provide data into the database management tool 206.

In a second example, in which a project management operation is implemented following the initial setup operation, the data may include data received from one or more users, for instance, personnel assigned to perform the deliverables, through the client devices 112-116. As discussed above, the client devices 112-116 may include a spreadsheet application accessible thereon through which the users may input the data as well as the data identifiers. As such, the spreadsheet application may be programmed with particular fields into which users may input the data and the data identifiers.

A screenshot 600 of a portion of an example spreadsheet application interface through which a user or a project manager may input the data and the data identifiers is depicted in FIG. 6. As shown therein, the user may input data pertaining to the type of activity performed, the workplan identification, enterprise identification, date of the time entry, the type of task being performed, the amount of time charged, the amount of time the user spent on vacation, identification of defects in one or more of the deliverables, etc. In addition, although not shown in FIG. 6, the spreadsheet application may be provided with additional custom input fields. Through use of the spreadsheet application and assignment of deliverables to teams of personnel, the time that a user charges to a deliverable may be tracked on a relatively low level while allowing the initial authorization for the user to charge time to the deliverables to be at a relatively high level.

The data contained in the "TasksType" fields generally enable "team to deliverable" tracking instead of "team to task" tracking. Each of the deliverables contains several "buckets" of fields to compute the effort on "Prevention" (work done before start of production of the deliverable), "Production" (work performed to produce the deliverable), "Appraisal" (work to review the deliverable), "Internal Failure" (work done to remove the defects identified during the appraisal), and "External Failure" (work done to remove the defects identified in the next stages). Having these independent "buckets" and the ability to time track specifying the task type allows for computation of quality related metrics, such as, cost of quality and cost of poor quality, without the need to create several tasks for any given deliverable.

A screenshot 700 of a portion of an example spreadsheet application interface through which a user or a project manager may input or update data to the Work Products, Action Items, and/or Defects tables 232-236 in the database 230 is depicted in FIG. 7. As shown therein, the user or project manager may input data pertaining to various aspects of the project. In this regard, the user or project manager may easily input data to be inserted/updated in the tables 232-236 through the spreadsheet application interface.

The data entered into the spreadsheet application may be communicated from the user devices 112-116 to the computing device 200 while the client devices 112-116 are either online or offline. In this regard, the spreadsheet application stored on the user devices 112-116 may be equipped with an input option that allows users to upload the entered data to the computing device 200 once a connection to the computing device 200 has been established. Since the users have the option to update their timesheets as well data relevant to other aspects of the project while being disconnected from the computing device 200, the users may be more inclined to submit their timesheets and other data in a timely fashion.

Through use of the spreadsheet application to input data pertaining to the workplans, deliverables, etc., the data is linearly arranged, which is substantially easier to manage than conventional project management tools that arrange tasks in a tree structure. In addition, the arrangement of the data in the tables 232-240 generally enables a one-to-one correlation to be developed between the data that is accessible by the database management tool and the program management tool. In this regard, a user may employ each of these tools in manners for which they are best suited without requiring data accessible through one tool to be converted in a substantially complex manner to be accessible in the other tool. For instance, a user may use the program management tool to access data pertaining to the time spent working on the deliverables and the database management tool to track statuses of the deliverables.

In addition, through use of the interfaces depicted in FIGS. 4-7, data may be inputted into the database through either or both of a spreadsheet application through a spreadsheet application interface and a database management tool through a database management tool interface.

At step 306, a determination as to whether the data received at step 304 is valid is made, for instance, by the data validation module 210. Step 306 is considered to be optional because during the initial setup operation, the data received from the program manager may be construed as being valid and thus, a validity check at step 306 is not needed. However, when step 306 is performed, the determination of whether the data is valid may depend upon the category associated with the data. By way of example in which the data comprises time entry data of a particular user pertaining to a particular deliverable, the data validity module 210 may determine that the data is valid if the user is a member of a team authorized to charge time to the particular deliverable. In addition, or alternatively, the data validity module 210 may determine whether a particular user belongs to a particular project (for instance, the database 230 may include a "WorkProduct" record having a type of "Resource" containing the name of the resource), whether the resource is active (which may depend on the state of the "Resource" record, whether the work product for the deliverable is active (the work product may be "waiting", which implies that the work product for the deliverable is not authorized to start, or "completed", which implies that the deliverable was completed in the past), whether the team work product is active (the teams may also be "waiting" or "completed" similarly to the work product), whether the timesheet is timely (for instance, timesheets that are older than a predetermined length of time may be considered to be invalid), etc.

If the data is determined to be invalid, for instance, if the user is not part of a team authorized to charge their time to the particular deliverable, the data may be dropped as indicated at step 308. Alternatively, the data may be entered with an indication that the data has been found to be invalid. In addition, the computing device 200 may receive other data and category information at step 304 and may continue performing steps 306 and 308 as necessary.

If, however, the data is determined to be valid or if step 306 is not performed, at step 310, the data is stored in the database 230 according to the data identifiers, for instance, by the database management tool module 206. By way of example, the database management tool module 206 compares the data identifiers to rules associated with entry of the data into the tables 232-240 to determine which of the tables 232-240 the data is to be entered. Thus, for instance, data having identifiers that meet the rules associated with the journal table 238, such as timesheets, are entered into the journal table 238.

As discussed above, the data is stored in the database 230 to enable a data management tool, such as, ClearQuest™, to access the data contained in the database 230. In this regard, a user may relatively easily access the data contained in the database 230, and may easily access the data contained in the respective tables 232-240.

At step 312, records accessible by a program management tool are produced from the data stored in the tables 232-240, for instance, by the program management tool module 208. More particularly, for instance, the program management tool may be programmed with custom fields that match attributes of the deliverables recited in the work product table 232. In this regard, there is a one-to-one relationship between the records that are accessible by the program management tool and the data that are accessible by the database management tool. One result of this type of relationship is that a user may implement the database management tool to track the statuses of deliverables and the program management tool to track time charged by users to the deliverables and the dates that the deliverables are completed.

At step 314, one or more metrics associated with the data stored in the one or more tables 232-240 are computed, for instance, by the metrics computing module 214 of the batch module 212. The metrics may include, for instance, an analysis of the progress of the project, an analysis of the amount of time being spent by personnel on each of the deliverables, defects arising in the project, etc.

At step 316, outcomes of variations of the data stored in the one or more tables 232-240 are optionally predicted, for instance, by the prediction module 218 of the batch module 212. More particularly, for instance, the prediction module 218 may receive various combinations of data and may run prediction models, such as, Monte Carlo simulations, on the various combinations of data to produce the predicted outcomes. By way of particular example, a user may input data pertaining to increasing budget and time spent on a particular deliverable and increasing the budget and time spent on another particular deliverable to determine which of the increases resulted in a better outcome. The user may thus analyze the predicted outcomes in optimizing performance of tasks to complete the project. Through implementation of the prediction module 218, users may thus substantially avoid the high costs, time and complexity required to manually create control charts, capability charts, regression equations, boxplots, and other ANOVA techniques, as well as running prediction models because these are automatically created by the prediction module 218.

At step 318, one or more reports detailing at least one of the one or more metrics computed at step 314 and/or the outcomes predicted at step 316 are produced, for instance, by the messaging module 216 of the batch module 212. In addition, the data contained in the one or more tables may be evaluated to determine whether data, such as a personnel's time entries, is missing, and one or more messages directed to personnel responsible for the missing data are generated and sent to the personnel, for instance, by the messaging module 216. Steps 314-318 may be performed as a batch program during non-business hours, such that, the data used in the performance of steps 314-318 is current. In addition, the messages and reports may automatically be generated and communicated to responsible personnel on a daily basis to thus minimize missed timesheets and other data.

Some or all of the operations set forth in the figures may be contained as a utility, program, or subprogram, in one or more computer readable storage mediums. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage devices include conventional computer system random access memory (RAM), read-only memory (ROM), erasable programmable read-only memory (EPROM), electrically erasable programmable read-only memory (EEPROM), and magnetic or optical disks or tapes. Concrete examples of the foregoing include distribution of the programs on a compact disc read only memory (CD ROM) or via Internet download. It is therefore to be understood that any electronic device capable of executing the above-described functions may perform those functions enumerated above.

Figure 8:
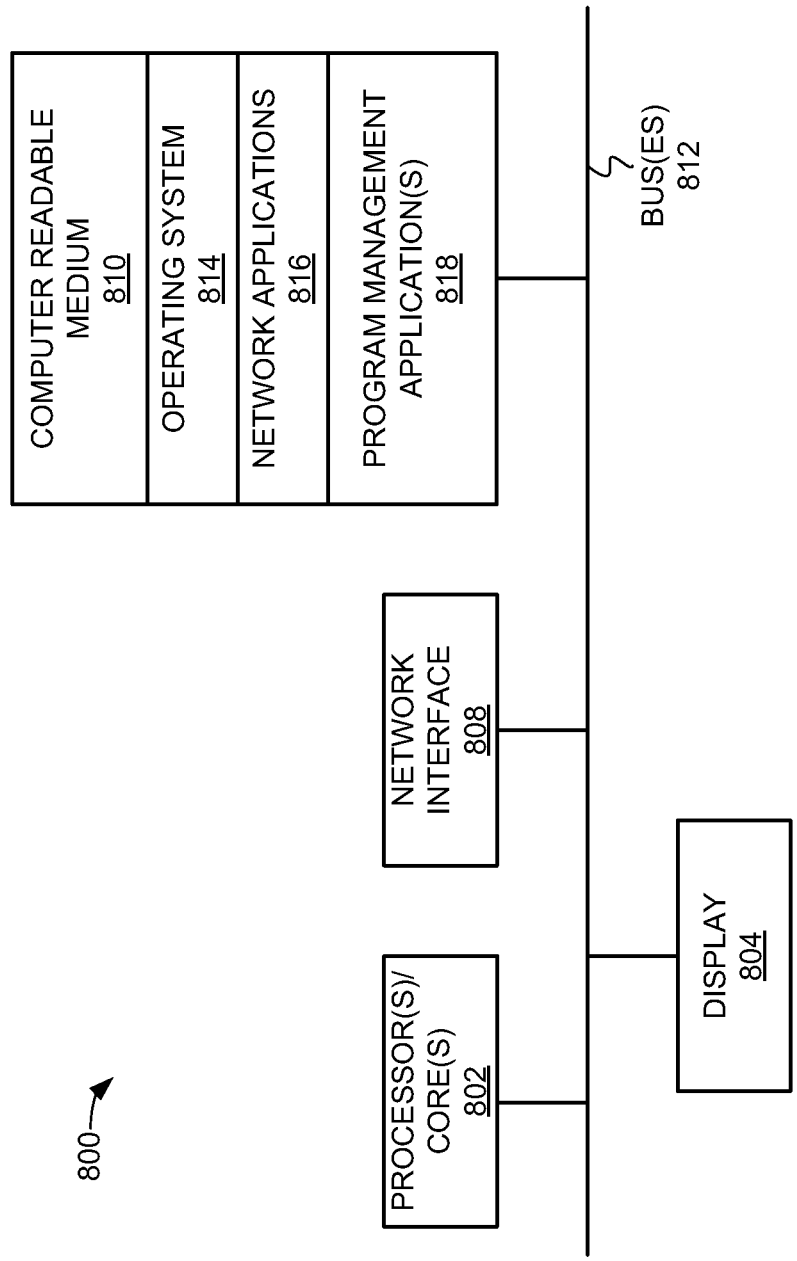
FIG. 8 illustrates a block diagram of a computer apparatus configured to implement or execute one or more of the processes depicted in FIG. 3, according to an embodiment of the present invention.

FIG. 8 illustrates a block diagram of a computing apparatus 800, such as the computing device 200 depicted in FIG. 2, according to an embodiment. It should be understood that the illustration of the computing apparatus 800 is a generalized illustration and that the computing apparatus 800 may include additional components and that some of the components described may be removed and/or modified without departing from the scope of the computing apparatus 800.

The computing apparatus 800 includes one or more processors, each of which includes one or more cores 802 (processor(s) 802), such as a central processing unit; one or more display devices 804, such as a monitor; one or more network interfaces 808, such as a Local Area Network LAN, a wireless 802.11x LAN, a 3G mobile WAN or a WiMax WAN; and one or more computer-readable mediums 810. Each of these components is operatively coupled to one or more buses 812. For example, the bus 812 may be an EISA, a PCI, a USB, a FireWire, a NuBus, or a PDS.

The computer readable medium 810 may be any suitable medium that participates in providing instructions to the processor(s)/core(s) 802 for execution. For example, the computer readable medium 810 may be non-volatile media, such as an optical or a magnetic disk; volatile media, such as memory; and transmission media, such as coaxial cables, copper wire, and fiber optics. Transmission method can also take the form of acoustic, light, or radio frequency waves.

The computer-readable medium 810 may also store an operating system 814, such as Mac OS, MS Windows, Unix, or Linux; network applications 816; and one or more program management application(s) 818. The operating system 814 may be multi-user, multiprocessing, multitasking, multi-threading, real-time and the like. The operating system 814 may also perform basic tasks such as recognizing input from input devices, such as a keyboard or a keypad; sending output to the display 804; keeping track of files and directories on the computer readable medium 810; controlling peripheral devices, such as disk drives, printers, image capture device; and managing traffic on the one or more buses 812. The network applications 816 includes various components for establishing and maintaining network connections, such as software for implementing communication protocols including TCP/IP, HTTP, Ethernet, USB, and FireWire.

The program management application(s) 818 provides various software components, such as the modules 204-218 depicted in FIG. 2. In certain embodiments, some or all of the processes performed by the program management application(s) 818 may be integrated into the operating system 814. In certain embodiments, the processes can be at least partially implemented in digital electronic circuitry, or in computer hardware, firmware, software, or in any combination thereof.

What have been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A project management system comprising:
   a database formed of tables; and
   a computing device to,
   receive project data including work plans describing time frames for deliverables for a project;
   receive identifier data, wherein the identifier data identifies teams of individuals authorized to work on the deliverables, wherein the teams of individuals are assigned to the deliverables in a one-to-one relationship;
   store the received project data in the tables based upon the identifier data, wherein the tables comprise a work product table containing project data pertaining to work products, an action item table containing project data pertaining to action items, a defect table containing project data pertaining to defects, a journal table containing project data pertaining to journals, and a time series table containing project data pertaining to time series;
   identify multiple variations of combinations of the project data stored in the work product table, the action item table, the defect table, the journal table, and the time series table;
   predict different outcomes for the project resulting from the identified multiple variations; and
   identify an optimal variation of the multiple variations based on the predicted different outcomes,
   wherein to identify the optimal variation, the computing device is to compute, for each of the predicted different outcomes, one or more metrics associated with performance of the project.

2. The project management system according to claim 1, wherein the computing device is to receive the project data and the identifier data through one or more input devices, wherein each of the one or more input devices comprises a spreadsheet program, and wherein the computing device is further to receive the project data and the identifier data as entries into the spreadsheet program, wherein the spreadsheet program is to automatically upload the project data and the identifier data into the tables.

3. The project management system according to claim 1, wherein project data contained in the database is directly accessible through both a database management tool and a project management tool.

4. The project management system according to claim 1, wherein the computing device is to validate the received project data and to store the project data in response to a determination that the received project data is valid.

5. The project management system according to claim 3, wherein the project management tool comprises fields that match attributes of the deliverables stored in the database and wherein the computing device is to produce records from the deliverables to be addressable by the fields.

6. The project management system according to claim 1, wherein the computing device is to track a quality cost without breaking down the deliverables into multiple tasks.

7. The project management system according to claim 1, wherein the metrics include an analysis of progress of the project, an analysis of an amount of time being spent by personnel on each of the deliverables, and defects arising in the project.

8. The project management system according to claim 1, wherein the computing device is to evaluate the project data stored in the tables to determine whether data is missing, generate one or more emails directed to personnel responsible for the missing data, and send the generated one or more emails to the personnel.

9. A method of managing a project, said method comprising steps performed by a processor of:
   receiving project data including work plans describing time frames for deliverables for a project;
   receiving identifier data, wherein the identifier data identifies teams of individuals authorized to work on the deliverables, wherein the teams of individuals are assigned to the deliverables in a one-to-one relationship;
   storing, by the processor, the received project data in tables in a database based upon the identifier data, wherein the tables comprise a work product table containing project data pertaining to work products, an action table containing project data pertaining to action items, a defect table containing project data pertaining to defects, a journal table containing project data pertaining to journals, and a time series table containing project data pertaining to time series;
   identifying multiple variations of combinations of the project data stored in the work product table, the action item table, the defect table, the journal table, and the time series table;
   predicting different outcomes for the project resulting from the identified multiple variations;
   calculating, for each of the predicted different outcomes, one or more metrics associated with performance of the project; and
   identifying an optimal variation of the multiple variations based on the calculated one or more metrics.

10. The method according to claim 9, further comprising:
    validating the received project data; and
    wherein storing the received project data further comprises storing the received project data in response to a determination that the received project data is valid.

11. The method according to claim 9, further comprising producing one or more records with addressable fields that match attributes of the deliverables stored in the database.

12. The method according to claim 9, further comprising:
    producing one or more reports detailing at least one of the calculated metrics.

13. The method according to claim 9, further comprising:
    evaluating the project data stored in the tables to determine whether data is missing;
    generating one or more messages directed to personnel responsible for the missing data; and
    sending the generated one or more messages to the personnel.

14. The method according to claim 9, wherein receiving the project data and the identifier data further comprises receiving the project data and the identifier data from data inputted into a spreadsheet program, and the spreadsheet program automatically uploading the project data and the identifier data into the database.

15. A non-transitory machine-readable storage medium on which is embedded instructions that when executed on a computer implement a method of managing a project, said instructions to cause the computer to:

receive project data including work plans describing time frames for deliverables for a project;

receiving identifier data, wherein the identifier data identifies teams of individuals authorized to work on the deliverables, wherein the teams of individuals are assigned to the deliverables in a one-to-one relationship;

store the received project data in tables in a database based upon the identifier data, wherein the tables comprise a work product table containing project data pertaining to work products, an action table containing project data pertaining to action items, a defect table containing project data pertaining to defects, a journal table containing project data pertaining to journals, and a time series table containing project data pertaining to time series;

identify multiple variations of combinations of the project data stored in the work product table, the action item table, the defect table, the journal table, and the time series table;

predict different outcomes for the project resulting from the identified multiple variations;

calculate, for each of the predicted different outcomes, one or more metrics associated with performance of the project; and identify an optimal variation of the multiple variations based on the calculated one or more metrics.

* * * * *